United States Patent [19]
Goodall et al.

[11] 3,896,719
[45] July 29, 1975

[54] MOUNTING DEVICE

[75] Inventors: Charles Clifford Owen Goodall; Edward George Amery, both of Essex, England

[73] Assignee: Ilford Limited, Essex, England

[22] Filed: May 8, 1974

[21] Appl. No.: 468,156

[30] Foreign Application Priority Data
May 16, 1973 United Kingdom............. 23346/73

[52] U.S. Cl. ................ 100/169; 100/176; 68/256; 226/187
[51] Int. Cl. ...................... B30b 3/04; D06f 45/00
[58] Field of Search .......... 100/121, 168, 169, 170, 100/171, 176; 68/244, 257, 256; 226/187, 177; 308/15, 26

[56] References Cited
UNITED STATES PATENTS
35,726   6/1862   Wilson ................................. 68/256
1,228,178   5/1917   Brooker ........................... 68/256 X FOREIGN PATENTS OR APPLICATIONS
877,440   5/1953   Germany ............................. 68/257
1,030,295   5/1958   Germany ............................. 68/256

*Primary Examiner*—Peter Feldman
*Attorney, Agent, or Firm*—Wenderoth, Lind & Ponack

[57] ABSTRACT

A mounting means for a pair of nip rollers which comprises at each end of the pair of rollers an external mounting plate and an apertured plate, each roller of the said pair having at each end a spindle mounted in a spindle bearing, the bearings passing through one of the apertured plates and being connected to one of the mounting plates, the bearings connected to one roller being a fixed pair and the bearings connected to the other roller being a movable pair, the movable pair being biassed towards the fixed pair, each apertured plate having an aperture in which one of the fixed bearings is located and an aperture in which one of the movable bearings is located but which is greater in area than the diameter of the movable bearing, each movable bearing being attached to one of the mounting plates by a peg mounted thereon that locates in an aperture that is eccentric with regard to its centre so that the bearing is able to rotate about the peg in a direction towards or away from the fixed bearing, the amount of rotation being limited by the shape of the aperture in the apertured plate in which it is located.

10 Claims, 2 Drawing Figures

PATENTED JUL 29 1975

3,896,719

MOUNTING DEVICE

This invention relates to a mounting for a pair of rotatable nip rollers. Pairs of nip rollers are often used in sheet material processing apparatus to traverse the sheet material through the apparatus and/or to squeege liquid off the sheet material after the material has had a liquid applied to it. In most pairs of nip rollers one roller is fixed and the other roller is movable in a direction towards the fixed roller. In normal operation the two rollers just touch but when sheet material is introduced into the nip of the rotating rollers the movable roller separates from the fixed rollers sufficiently to enable the sheet material to be traversed between the pair of rollers.

It is the object of the present invention to provide a simple mounting means for a pair of nip rollers.

According to the present invention an apparatus which comprises at least one pair of driven nip rollers there is provided a mounting means for the said pair of nip rollers which comprises at each end of the pair of rollers an external mounting plate and an apertured plate, each roller of the said pair having at each end a spindle mounted in a spindle bearing, the bearings passing through one of the apertured plates and being connected to one of the mounting plates, the bearings connected to one roller being a fixed pair and the bearings connected to the other roller being a movable pair, the movable pair being biassed towards the fixed pair, each apertured plate having an aperture in which one of the fixed bearings is located and an aperture in which one of the movable bearings is located but which is greater in area than the diameter of the movable bearing, each movable bearing being attached to one of the mounting plates by a peg mounted thereon that locates in an aperture that is eccentric with regard to its centre so that the bearing is able to rotate about the peg in a direction towards or away from the fixed bearing, the amount of rotation being limited by the shape of the aperture in the apertured plate in which it is located.

Preferably the movable bearings are circular bearings and preferably the apertures in which the movable bearings are located have circular apertures the diameter of which are greater than the diameters of the movable circular bearings.

Preferably the fixed bearings are also circular bearings.

Most preferably each of the fixed bearings is connected to one of the mounting plates by a peg which locates therein. In such case if the fixed bearing is a circular bearing the diameter of said aperture is not substantially greater than the diameter of the circular bearing so that the fixed bearing can not rotate towards or away from the movable bearing even if the peg be located eccentrically with regard to the centre of the circular bearing. Nor can the fixed bearings if of circular shape, rotate under the influence of the roller spindle because of the restraint imparted on them by the pegs being mounted eccentrically with regard to the spindle.

The movable bearing may be biased towards the fixed bearings by gravity, e.g. the weight of the roller mounted in the bearing, if the movable bearing is above the fixed bearing, may be sufficient to bias the movable bearing towards the fixed bearing or the biassing means may be spring clips (or garters) or bands of rubber of synthetic material, which encircle both pairs of bearings.

In practice the two apertured plates in which the bearings are located may form part of the outer cover of the apparatus while the mounting plates may be small external plates which are of sufficient size to mount the pegs but which need not cover all the ends of the bearings. These plates may be attached by flanges to the apertured plates. The apertured plates need only to be of thin sheet metal but which is of sufficient strength to support the weight of the shafts of the rollers.

Thus in the most preferred embodiment the mounting device for the pair of nip rollers is extremely simple and no expensive-to-machine parallel slots in which the bearings are to be mounted are required. Both the bearings and the apertures through which they protrude are circular which is the easiest shape to reproduce. The actual mounting plates with two pegs thereon are also extremely easy to produce.

In operation the pair of nip rollers is caused to rotate and when a sheet of paper is introduced into the nip, the roller which is connected to the movable bearings is able to move away from the roller which is connected to the fixed bearings and the sheet of paper is transported between the rotating rollers. Various thicknesses of paper can be accommodated the limits being the tension in the biassing means or the weight of the movable roller if located above the fixed roller and the diameter of the aperture in which the movable bearings are located.

The accompanying drawings will serve to illustrate a preferred embodiment of the roller mounting device of the present invention.

Figure 2:
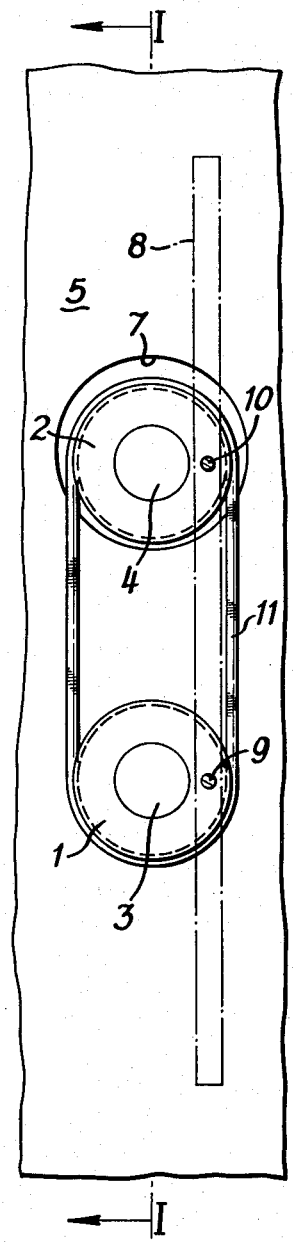
FIG. 2 is part sectional end view of the mounting of the roller A and B.

FIG. I is a sectional side elevation taken along the line I—I on FIG. 2.

Figure 1:
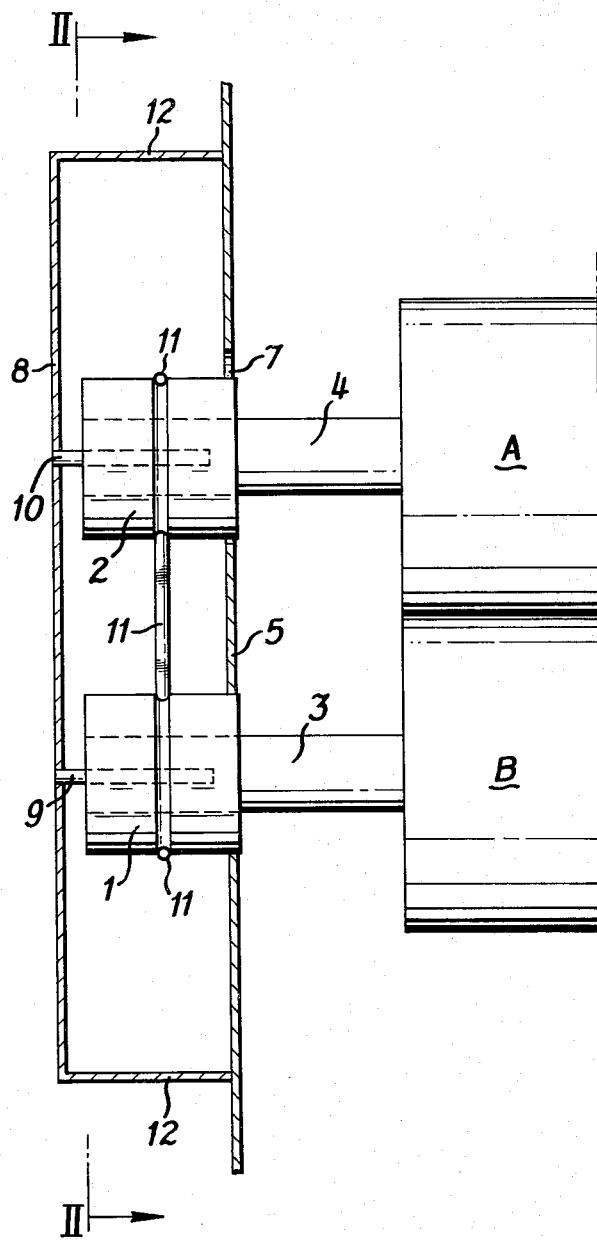
FIG. 1 is a sectional side elevation of an apparatus which comprises a pair of squeegee nip rollers A and B.

FIG. II is a part sectional end view taken along the line II—II on FIG. 1.

In both figures the numbers bear the same signification.

It is to be understood that a similar roller mounting device is present at the other end of the rollers A and B.

In the figures two bearing blocks 1 and 2 composed of polyacetal have central holes in which roller spindles 3 and 4 rotate. The cover plate of the apparatus 5 has two holes 6 and 7 therein. Hole 6 fits closely round the lower bearing 1 but hole 7 is larger than bearing 2 thus permitting movement of the bearing. A plate 8 attached to cover plate 5 by brackets 12 carries two pegs 9 and 10 of which 9 is inserted into the lower bearing block 1 in a direction parallel to the axis but displaced eccentrically from the centre. Peg 10 is inserted into the bearing block 2 in a similar manner. Thus the bearing 2 is free to move up and down to the limits of hole 7. The bearing 2 is biassed towards bearing 1 by a spring garter 11 which passes round both bearings.

One or both of the rollers A and B may be driven by external means (not shown). When a sheet of material is introduced between the rollers the top roller can move slightly away while maintaining a pressure on the material determined by the tension in the spring garters 11 at each end of the rollers.

The cover plate of the apparatus is the apertured plate 5 while the plate 8 which is attached to the apertured plate 5 by brackets 12 is the bearing mounting plate. As shown in FIG. 2 this plate is big enough to carry the pegs 9 and 10 but does not need to cover all the bearings 1 and 2.

Thus the mounting device of the present invention is very simple and does not require any of the close tolerance machining which is required when parallel slots are used. Since it is the size of the apertures in the cover plate of the apparatus which determine the distance through which the movable bearing and hence the roller attached thereto can travel an extremely simple bearing mounting plate can be used.

What we claim is:

1. In an apparatus which comprises at least one pair of driven nip rollers a mounting means for the said pair of nip rollers which comprises at each end of the pair of rollers an external mounting plate and an apertured plate, each roller of the said pair having at each end a spindle mounted in a spindle bearing, the bearings passing through one of apertured plates and being connected to one of the mounting plates, the bearing connected to one roller being a fixed pair and the bearing connected to the other roller being a movable pair, the movable pair being biassed towards the fixed pair, each apertured plate having an aperture in which one of the fixed bearings is located and an aperture in which one of the movable bearings is located which is greater in area than the diameter of the movable bearing, each movable bearing being connected to one of the mounting plates by a peg mounted thereon which locates in an aperture which is eccentric with regard to its centre so that the bearing is able to rotate about the peg in a direction towards or away from the fixed bearings, the amount of rotation being limited by the shape of the aperture in the apertured plate in which it is located.

2. An apparatus according to claim 1 wherein the movable bearings are circular bearings.

3. An apparatus according to claim 2 wherein the aperture in which the circular movable bearings are located are circular, the diameter of these apertures being greater than the diameter of the movable circular bearings.

4. An apparatus according to claim 3 wherein the fixed bearings are circular bearings.

5. An apparatus according to claim 4 wherein the diameter of the apertures in which the fixed bearings are located is not substantially greater than the diameter of the circular bearing.

6. An apparatus according to claim 5 wherein the fixed bearings are connected to one of the mounting plates by a peg which locates therein.

7. An apparatus according to claim 6 wherein the pegs locate in the bearings eccentrically with regard to the centre of the circular bearing.

8. An apparatus according to claim 1 wherein the movable bearings are biassed towards the fixed bearings by gravity.

9. An apparatus according to claim 1 wherein movable bearings are biassed towards the fixed bearings by means of spring clips or bands of rubber or synthetic material which encircle both pairs of bearings.

10. An apparatus according to claim 1 wherein the two apertured plates form part of the outer cover of the apparatus and the mounting plates are small external plates attached to the apertured plates.

* * * * *